US012633239B2

(12) United States Patent
Kim

(10) Patent No.: US 12,633,239 B2
(45) Date of Patent: May 19, 2026

(54) PERSONAL IMMERSIVE DISPLAY DEVICE

(71) Applicant: LG Display Co., Ltd., Seoul (KR)

(72) Inventor: Mincheol Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 196 days.

(21) Appl. No.: 18/530,009

(22) Filed: Dec. 5, 2023

(65) Prior Publication Data

US 2024/0212534 A1 Jun. 27, 2024

(30) Foreign Application Priority Data

Dec. 27, 2022 (KR) ........................ 10-2022-0185236

(51) Int. Cl.
*G09G 3/00* (2006.01)
*G06T 3/18* (2024.01)

(52) U.S. Cl.
CPC .............. *G09G 3/001* (2013.01); *G06T 3/18* (2024.01); *G09G 2300/0452* (2013.01); *G09G 2340/0407* (2013.01)

(58) Field of Classification Search
CPC .............. G06T 3/18; G09G 2300/0452; G09G 2340/0407; G09G 3/001
See application file for complete search history.

(56) References Cited

U.S. PATENT DOCUMENTS

| | | | | |
|---|---|---|---|---|
| 8,388,138 B1* | 3/2013 | Boothroyd | ........... | H04N 9/3167 |
| | | | | 359/464 |
| 2008/0036854 A1* | 2/2008 | Elliott | .................. | H04N 19/597 |
| | | | | 348/55 |
| 2011/0234584 A1* | 9/2011 | Endo | ..................... | H04N 13/359 |
| | | | | 345/419 |
| 2014/0029836 A1* | 1/2014 | Keselman | ........... | H04N 13/139 |
| | | | | 382/154 |
| 2015/0373793 A1* | 12/2015 | Bower | .................. | H10H 20/83 |
| | | | | 362/20 |
| 2016/0343315 A1* | 11/2016 | Richards | .............. | G02B 27/017 |
| 2017/0115489 A1* | 4/2017 | Hu | ..................... | G02B 27/0172 |
| 2019/0086669 A1* | 3/2019 | Percival | ................. | G06F 3/012 |
| 2019/0361659 A1 | 11/2019 | Hyun et al. | | |
| 2020/0027932 A1 | 1/2020 | Choi et al. | | |

FOREIGN PATENT DOCUMENTS

| | | |
|---|---|---|
| CN | 102356419 A | 2/2012 |
| CN | 106772738 A | 5/2017 |
| CN | 108027514 A | 5/2018 |
| JP | 2009106866 A | 5/2009 |
| TW | 202034290 A | 9/2020 |
| TW | I733498 B | 7/2021 |

* cited by examiner

*Primary Examiner* — Yingchun He
(74) *Attorney, Agent, or Firm* — Seed Intellectual Property Law Group LLP

(57) ABSTRACT

Embodiments of the disclosure may provide a personal immersive display device. The persona immersive display device includes a first display panel and a second display panel each including a plurality of pixels. The first display panel and the second display panel are offset from each other in a user's field of view.

14 Claims, 15 Drawing Sheets

PERSONAL IMMERSIVE DISPLAY DEVICE

CROSS-REFERENCE TO RELATED APPLICATION

This application claims priority from Korean Patent Application No. 10-2022-0185236, filed on Dec. 27, 2022, which is hereby incorporated by reference for all purposes as if fully set forth herein.

BACKGROUND

Technical Field

Embodiments of the disclosure relate to a personal immersive display device implementing virtual reality (VR) or augmented reality (AR).

Description of the Related Art

Virtual reality (VR) or augmented reality (AR) technology is applied to the fields of national defense, architecture, tourism, movies, multimedia, and games.

A personal immersive display device providing virtual reality (VR) has reached a commercialization stage and is widely applied in the entertainment industry. Further, it is developing to have applications in the medical, educational, and industrial fields.

The augmented reality (AR) display device, an advanced version of the virtual reality (VR) display device, is an imaging device that combines the real world and virtual reality, and has the feature capable of eliciting interaction between the real world and the virtual reality. The interaction between real world and virtual reality is based on the function of real-time providing information about the real situation and provides augmented effects by overlaying virtual objects or information on the environment of the real world.

BRIEF SUMMARY

According to the personal immersive display devices in the related art, these devices are implemented to be worn on the face or head. The inventors have realized that since the devices are viewed at a very short distance, the inter-pixel spacing, e.g., the pixel grid, may be visible when the resolution is low.

Embodiments of the disclosure may provide a personal immersive display device that reduces the sense of grid.

Embodiments of the disclosure may provide a personal immersive display device that reduces the sense of grid while reducing or minimizing a sense of heterogeneity between the left eye image and the right eye image.

Embodiments of the disclosure may provide a personal immersive display device, comprising a first display panel and a second display panel each including a plurality of pixels, wherein the first display panel and the second display panel are offset from each other in a user's field of view.

Embodiments of the disclosure may provide a personal immersive display device, comprising a first display panel and a second display panel each including a plurality of pixels, wherein the first display panel and the second display panel are different from each other in at least one of resolution and pixel structure.

According to embodiments of the disclosure, there may be provided a personal immersive display device configured to reducing the sense of grid by disposing a first display panel and a second display panel to be offset from each other to allow the pixel grid of the first display panel and the pixel grid of the second display panel to be offset from each other so that the pixel grid of either display panel overlaps the pixel of the other display panel and is faded by the light emitted from the overlapped pixel.

According to embodiments of the disclosure, there may be provided a personal immersive display device configured to reducing a sense of heterogeneity between the left eye image and right eye image due to an offset between display panels by offsetting the sampling position of the left eye image and the sampling position of the right eye image by the offset between the first display panel and the second display panel when sampling the left eye image and the right eye image in the source image.

According to embodiments of the disclosure, there may be provided a personal immersive display device configured to reducing the sense of grid by configuring the first display panel and the second display panel to have different resolutions so that the pixel grid of either display panel overlaps the pixel of the other display panel in the user's field of view and is faded by the light emitted from the overlapped pixel.

According to embodiments of the disclosure, there may be provided a personal immersive display device configured to reducing generation of a dark line at corresponding positions of the first display panel and the second display panel and perception of a dark line by configuring the first display panel and the second display panel to have different pixel structures.

Technical benefits of the disclosure are not limited to the foregoing, and other unmentioned benefits would be apparent to one of ordinary skill in the art from the following description.

BRIEF DESCRIPTION OF THE SEVERAL VIEWS OF THE DRAWINGS

The above and other benefits, features, and advantages of the disclosure will be more clearly understood from the following detailed description, taken in conjunction with the accompanying drawings, in which.

DETAILED DESCRIPTION

Figure 1A:
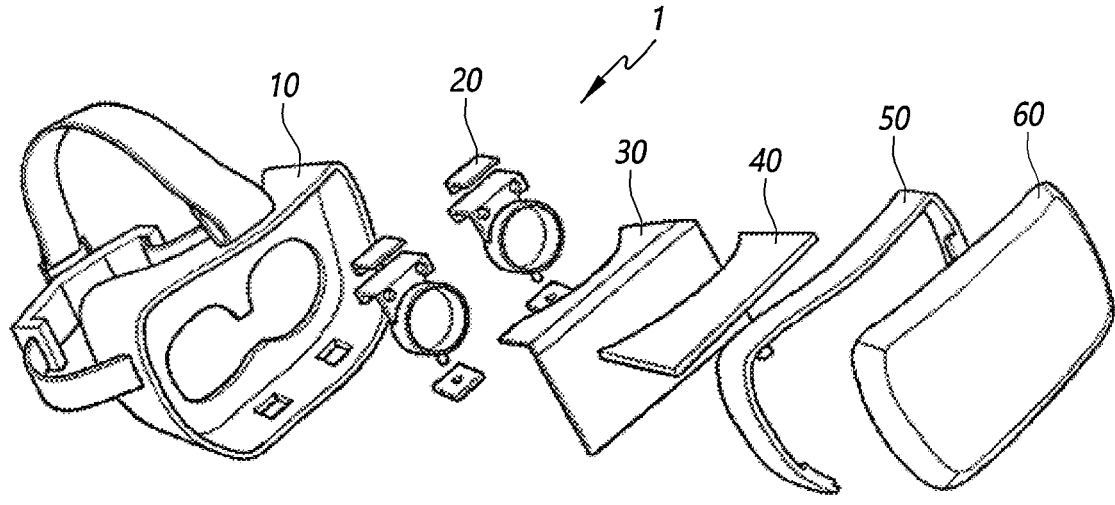
FIG. 1A is an exploded view illustrating a personal immersive display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the disclosure. Each of these terms is not used to define essence, order, sequence, or number of elements, etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure are described in detail with reference to the accompanying drawings.

FIG. 1A is an exploded view illustrating a personal immersive display device according to embodiments of the disclosure.

Figure 1B:
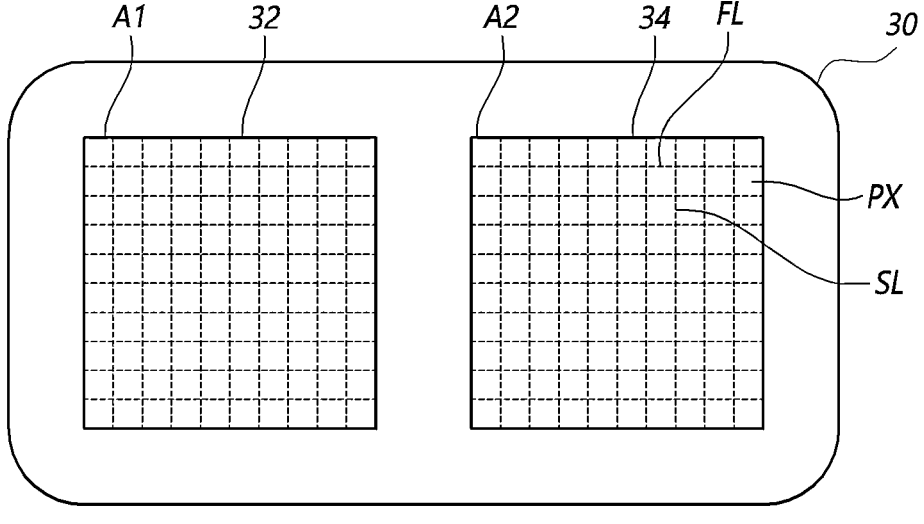
FIG. 1B is a view of a display module having a first display panel and a second display panel according to embodiments of the disclosure.

FIG. 1B is a view of a display module having a first display panel and a second display panel according to embodiments of the disclosure.

Figure 1C:
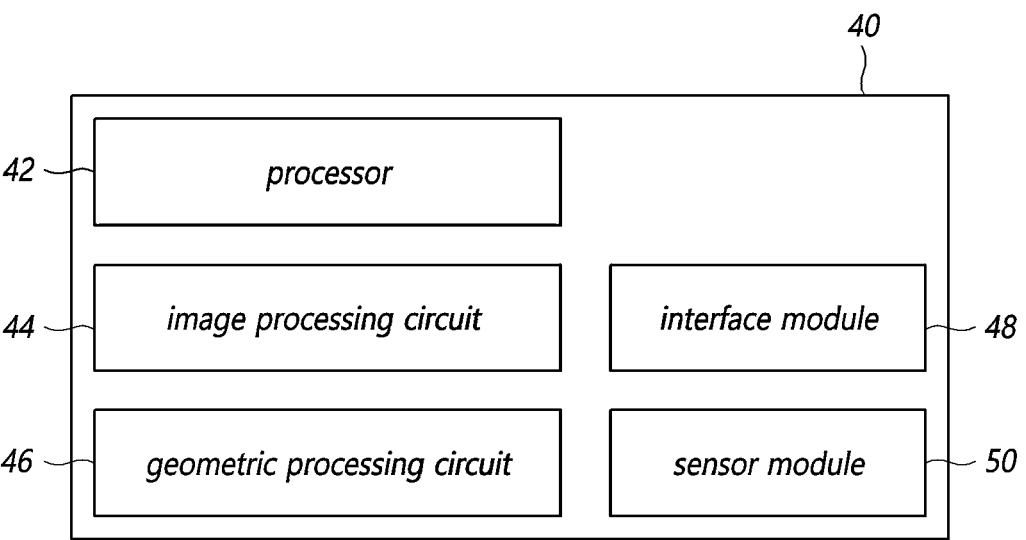
FIG. 1C is a schematic block diagram of a circuits in the system according to embodiments of the disclosure.

FIG. 1C is a schematic block diagram of a circuits of the system according to embodiments of the disclosure.

Referring to FIG. 1A, a personal immersive display device 1 according to embodiments of the disclosure may include a headgear 10, a lens module 20, a display module 30, a main board 40, a side frame 50, and a front cover 60. The personal immersive display device may also be referred to as an immersive device 1 or an immersive wearable device 1. Here, a headgear is illustrated. However, any type of wearable gear 10 can be used and a headgear is merely an example.

The display module 30 displays image data input from the main board 40. The image data may be 2D/3D image data that implements a video image of virtual reality VR or augmented reality AR. The display module 30 may display various types of information input from the main board 40 in the form of text, symbols, or the like.

Referring to FIG. 1B, the display module 30 includes a first display panel 32 and a second display panel 34. The first display panel 32 may display an image (e.g., left eye image) visible to the left eye. The second display panel 34 may display an image (e.g., right eye image) visible to the right eye. The display module 30 may include a display panel driving circuit for driving the first and second display panels 32 and 34.

In the disclosure, it is described that the first display panel 32 is a display panel for the left eye and the second display panel 34 is a display panel for the right eye, but the disclosure is not limited thereto. Conversely, the first display panel 32 may be a display panel for the right eye, and the second display panel 34 may be a display panel for the left eye.

The first display panel 32 and the second display panel 34 may be separately manufactured and disposed on the display module 30 away from each other by a selected distance. In each of the first display panel 32 and the second display panel 34, a plurality of pixels PX may be arranged in a first direction (e.g., a horizontal direction) and a second direction (e.g., a vertical direction). The pixel PX may be configured as, e.g., an organic light emitting diode (OLED) element.

In the first display panel 32, the gaps between the pixels PX are connected in a grid shape to form a pixel grid A1. In the second display panel 34, the gaps between the pixels PX is connected in a grid shape to form a pixel grid A2.

The pixel grids A1 and A2 may have a form in which a plurality of first lines FL extending substantially in the first direction (horizontal direction) and arranged along the second direction (vertical direction), and a plurality of second lines SL extending substantially in the second direction (vertical direction) and arranged transverse to the first direction (horizontal direction) to overlap each other.

The lens module 20 includes an ultra-wide-angle lens, e.g., a pair of fisheye lenses for widening the left and right eye angles of view of the user. That is, a first wide-angle lens is disposed between the left eye of the user and the display module and a second wide-angle lens is disposed between the right eye of the user and the display module. In other words, the pair of fisheye lenses include a left eye lens disposed in front of the first display panel 32 and a right eye lens disposed in front of the second display panel 34.

Referring to FIG. 1C, the system includes a number of circuits. These can be at coupled to the head set at various locations and can also be positioned on a main circuit board 40 if desired. The system includes a processor 42 to execute virtual reality software and supply the left eye image and the right eye image to the display module 30. According to some embodiments, the processor 42 may include an image processing unit 44. In other embodiments, the processor 42 may be operatively coupled to the image processing unit 44.

The image processing unit 44 may generate left eye and right eye image data by processing source image data input from the outside. The image processing unit 44 may adjust the resolution of the image data displayed on the first and second display panels 32 and 34 to be suitable for the first and second display panels 32 and 34 based on the depth information analysis result of the 2D image. The image processing unit 44 may down-sample the source image data input from the outside to be suitable for resolutions of the first and second display panels 32 and 34.

Optionally or additionally, the image processing unit 44 may perform geometric processing on the image by warping the position of the pixel. The image processing unit 44 may render the image data to fit the pixel structure of the first display panel 32 and the pixel structure of the second display panel 34. In some embodiments, the geometric processing function may be performed by a separate processor, a geometric processing unit 46 that is operatively coupled to the image processing unit 44. Similar to the image processing unit 44, the geometric processing unit 46 may be a separate processing circuitry from the processor 42 or may be part of and incorporated within the processor 42 based on various embodiments of the present disclosure. The term unit as used herein includes circuit components as part of the unit and thus these can be considered as image processing circuit 44, the geometric processing circuit 46.

The main board 40, namely the system may further include an interface module 48, a sensor module 50, etc., connected to an external device. The interface module 48 may be connected to an external device through an interface such as a universal serial bus (USB) or a high definition multimedia interface (HDMI). The sensor module 50 may include various sensors such as a gyro sensor (e.g., gryoscopes), velocity sensor, inertial sensors, and an acceleration sensor (e.g., accelerometers). The processor of the main board 40 may correct the left eye and right eye image data in response to the output signal of the sensor module and transmit the left eye and right eye image data of the input image received through the interface module to the display module 30.

The headgear 10 may include a back cover exposing fisheye lenses and a band connected to the back cover. The back cover, the side frame 50, and the front cover 60 of the headgear 10 are assembled to secure an inner space in which the components of the personal immersive display device are disposed and protect the components. The components include the lens module 20, the display module 30, and the main board 40. The band is connected to the back cover. The user may wear the personal immersive display device on his/her head with the band. When the user uses the personal immersive display device on his or her head, he or she looks at different display panels with the left and right eyes through fisheye lenses.

The side frame 50 is fixed between the headgear 10 and the front cover 60 to secure a gap in the inner space in which the lens module 20, the display module 30, and the main board 40 are disposed. The front cover 60 is disposed on the front surface of the personal immersive display device.

The personal immersive display device according to embodiments of the disclosure may be implemented in a head mounted display (HMD) structure as illustrated in FIG. 1A, but is not limited thereto. For example, the disclosure may be designed as a face mounted display (FMD) or an eye glasses-type display (EGD).

Figure 2:
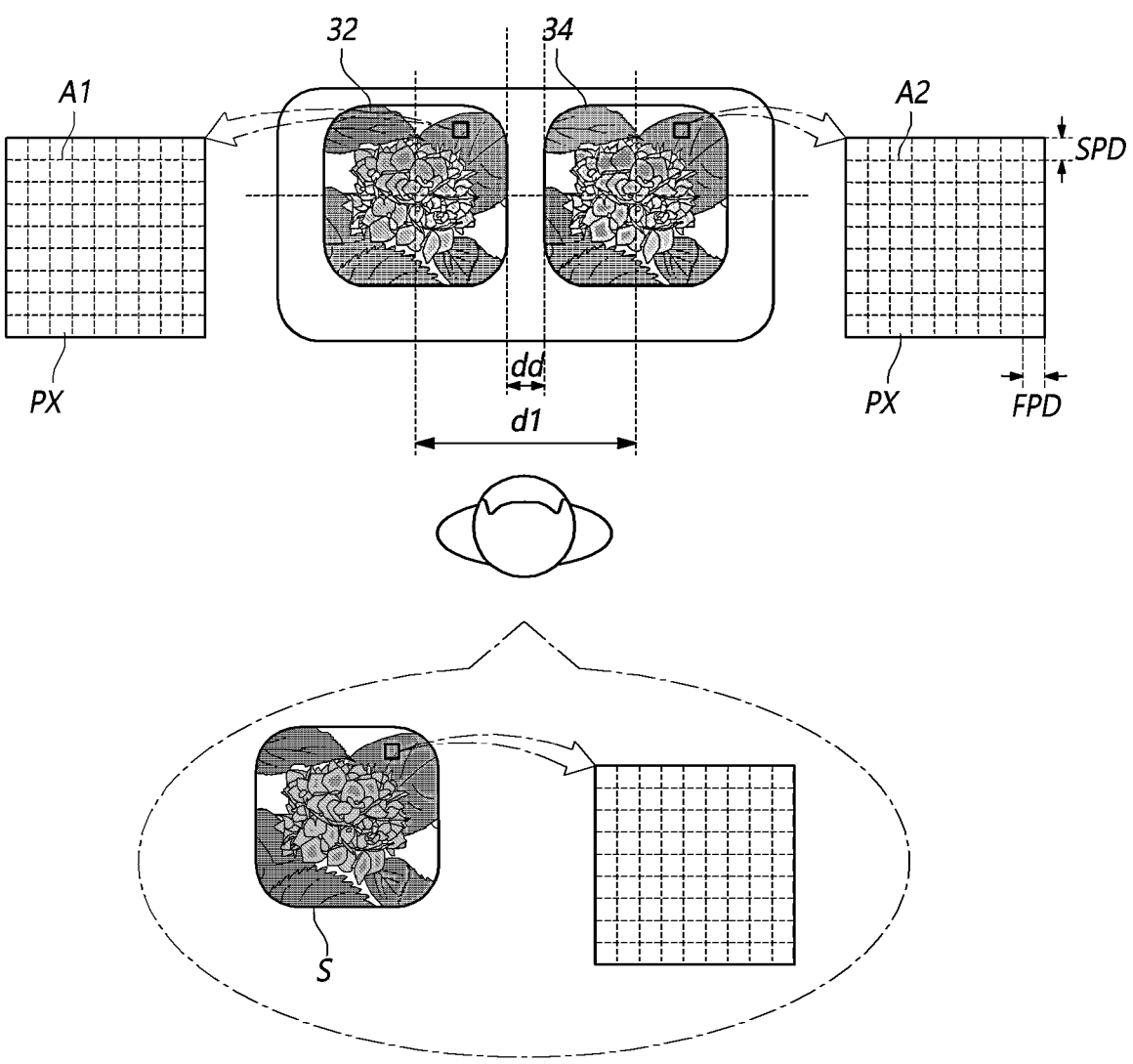
FIG. 2 is a view illustrating a personal immersive display device according to a first comparative example of the disclosure.

FIG. 2 is a view illustrating a personal immersive display device according to a first comparative example of the disclosure.

Referring to FIG. 2, the left eye image displayed on the first display panel 32 is transmitted to the brain through the left eye of the user, and the right eye image displayed on the second display panel 34 is transmitted to the brain through the right eye of the user. In the user's brain, the left eye image and the right eye image are synthesized into one and recognized. S of FIG. 2 indicates the image recognized by the user using the immersive display device, e.g., the user recognition image (e.g., an image that is reconstructed by the user by receiving the left eye image and the right eye image).

The first display panel 32 and the second display panel 34 are spaced apart from each other by a first gap d1 in the first direction (horizontal direction) and are disposed at the same position in the second direction (vertical direction). To elaborate, in one embodiment, the first gap d1 is a distance between the center of the first display panel 32 and the center of the second display panel 34. The distance between the first display panel 32 and the second display panel 34, distance dd, may be smaller than the first gap d1. In another embodiment, the first gap d1 can be a distance between a certain point of the first display panel 32 and a corresponding point of the second display panel 34.

In the user field of view, the first display panel 32 and the second display panel 34 are matched (or overlapped or combined) with each other. The corresponding ones of the pixels of the first display panel 32 and the pixels of the second display panel 34 are matched with each other to form the pixels of the user recognition image S. The unit pixel of the user recognition image S is generated by combining one pixel of the first display panel 32 and one pixel of the second display panel 34 at a position corresponding thereto. Accordingly, the user perceives the left eye image and the right eye image as one image without a sense of heterogeneity.

However, as the pixel grid of the first display panel 32 and the pixel grid of the second display panel 34 are disposed at positions corresponding to each other in the user field of view, there is a problem that the pixel grid is visible.

The fisheye lenses are present between the user's eyes and the display panels 32 and 34, and the distance between the user's eyes and the display panels 32 and 34 is very short, about several centimeters (cm). When the user views the image reproduced on the display panels 32 and 34 through the fisheye lenses, the user sees an image that is 4 to 5 times larger than the actual screen displayed on the display panels 32 and 34. If the resolution of the display panels 32 and 34 is low in such a close-up visual and fisheye lens-applied environment, the pixel grids are perceived as larger, reducing immersion.

Referring to FIG. 2, a single pixel PX has a first pixel dimension FPD in a first direction (horizontal direction when viewed in the drawings) and a second pixel dimension SPD in a second direction (vertical direction when viewed in the drawings). A size of a single pixel PX may be defined based on the first pixel dimension FPD and the second pixel dimension SPD.

Embodiments of the disclosure may suggest a method configured to reducing the sense of grid.

Figure 3:
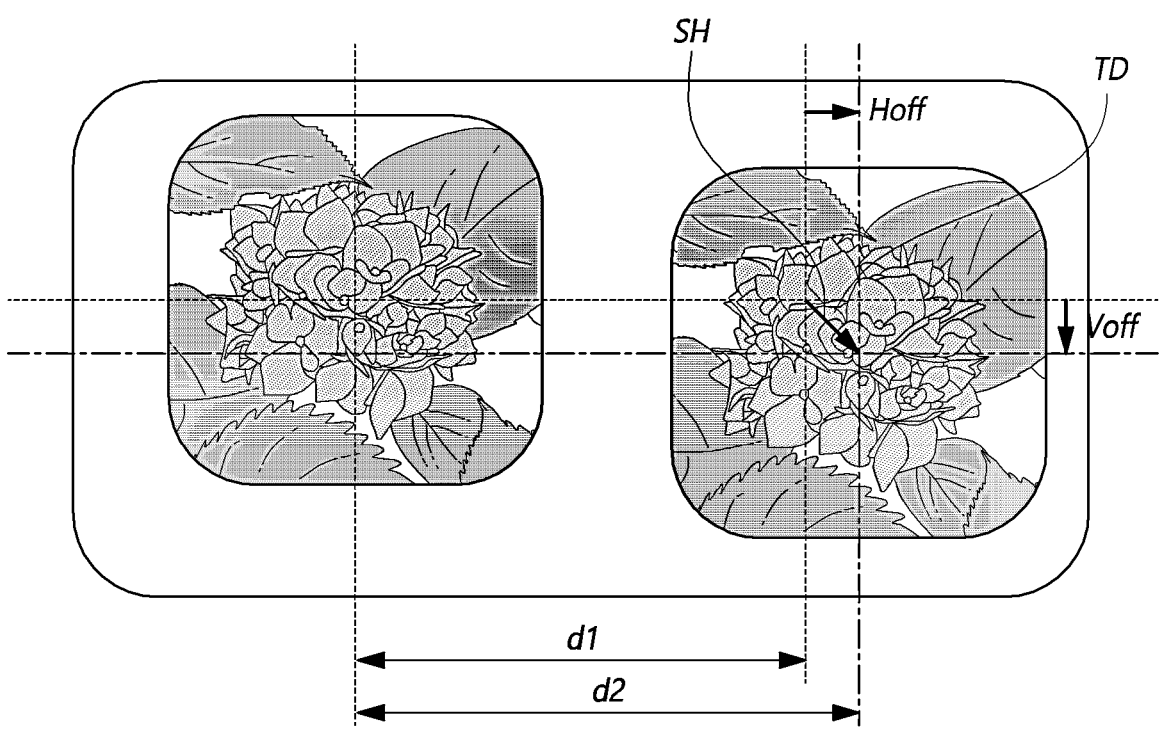
FIG. 3 is a view schematically illustrating an arrangement of a first display panel and a second display panel in a personal immersive display device according to embodiments of the disclosure.
Figure 4:
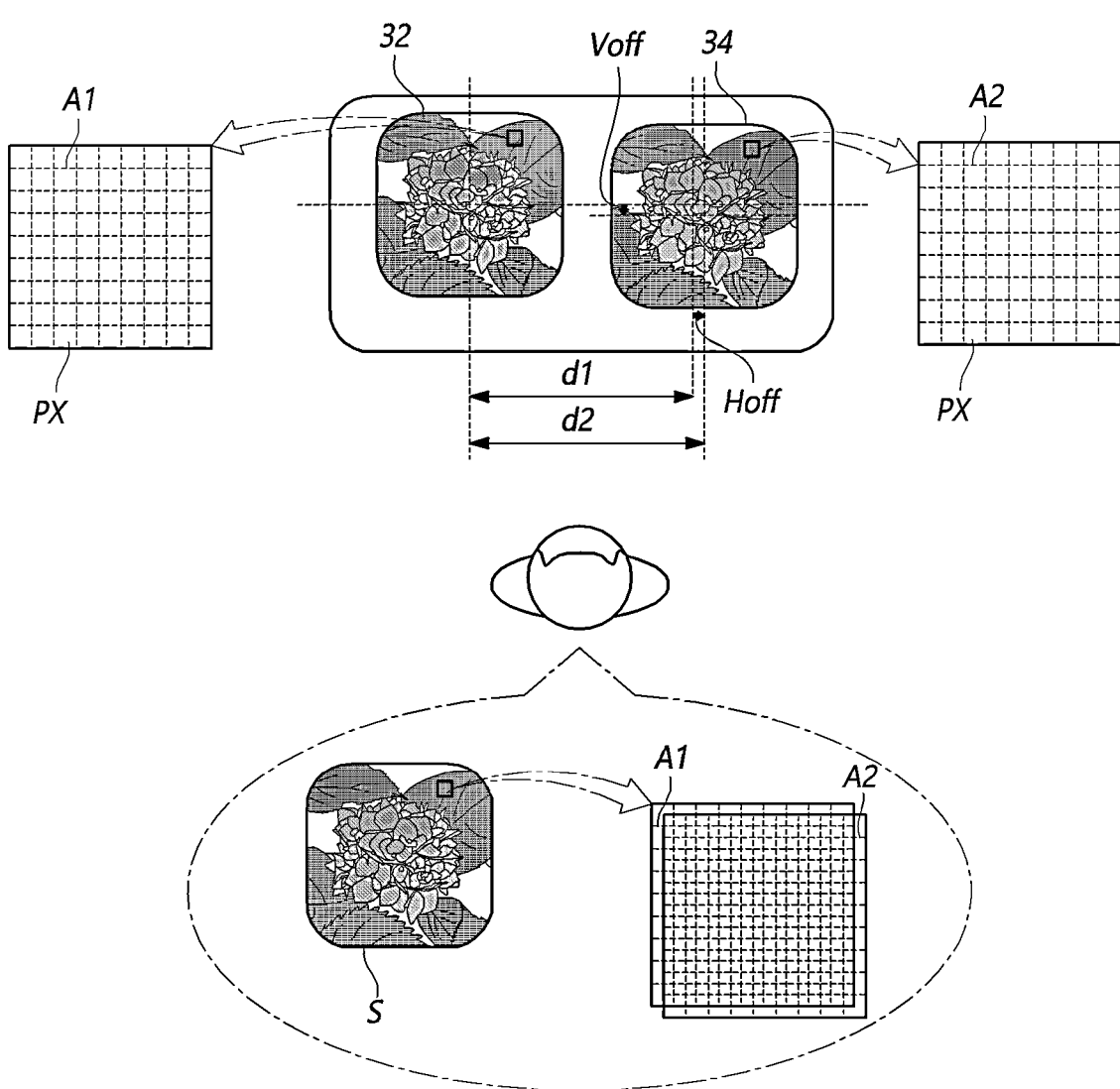
FIG. 4 is a view illustrating an example in which pixel grids of two display panels in a personal immersive display device are offset from each other according to embodiments of the disclosure.

FIG. 3 is a view schematically illustrating an arrangement of first and second display panels in a personal immersive display device according to embodiments of the disclosure, and FIG. 4 is a view illustrating an example in which pixel grids of two display panels in a personal immersive display device are offset from each other according to embodiments of the disclosure.

Referring to FIGS. 3 and 4, the first display panel 32 and the second display panel 34 are disposed to be spaced apart from each other by a second interval d2 in the first direction (horizontal direction). The second interval d2 is different from the first interval d1 by Hoff indicative of an offset distance in the horizontal direction (also referred to as horizontal offset distance). The first display panel 32 and the second display panel 34 are offset from each other by Voff in the second direction (vertical direction), where Voff is indicative of an offset distance in the vertical direction (also referred to as vertical offset distance).

The second display panel 34 of FIGS. 3 and 4 is disposed at a position shifted in a third direction (diagonal direction) crossing the first direction (horizontal direction) and the second direction (vertical direction) as compared to the second display panel 34 of FIG. 2. Hoff indicates a component in the first direction (horizontal direction) of the distance SH in which the second display panel 34 is shifted, and Voff indicates a component in the second direction (vertical direction) of the distance SH in which the second display panel 34 is shifted. That is, during operation, the second display panel is shifted by a horizontal offset distance Hoff and a vertical offset distance Voff with respect to first display panel. Note that the first display panel can also be shifted with respect to the second display panel by a horizontal and vertical offset distance. By doing so, the user having the wearable gear on combines the image data received from the first display panel via a first eye (e.g., left eye) and the image data received from the shifted second display panel via a second eye (e.g., right eye) so that the visibility of the pixel grids A1 and A2 is reduced. That is, the technical benefit of decreasing the sense of grid and grid lines can be achieved. The details are further explained in connection with FIGS. 3 and 4.

As described above, when the first display panel 32 and the second display panel 34 are arranged as illustrated in FIG. 2, the first display panel 32 and the second display panel 34 are matched with each other in the user recognition image S. Therefore, when the second display panel 34 is shifted as illustrated in FIG. 3, the first display panel 32 and the second display panel 34 are offset from each other in the user recognition image S as much as the second display panel 34 is shifted.

As the first display panel 32 and the second display panel 34 are offset from each other, as illustrated in FIG. 4, the pixel grid A1 of the first display panel 32 and the pixel grid A2 of the second display panel 34 may be offset from each other in the user recognition image S.

The direction in which the pixel grid A1 of the first display panel 32 and the pixel grid A2 of the second display panel 34 are offset is the same as the direction in which the first display panel 32 and the second display panel 34 are offset, e.g., the third direction TD (diagonal direction).

As illustrated in FIG. 4, in the user recognition image S, the pixel grid A1 of the first display panel 32 and the pixel grid A2 of the second display panel 34 may cross each other in an offset state, while overlapping each other only at the intersection point. In portions other than the intersection point, the pixel grid A1 or A2 of either display panel may overlap pixels of the other display panel.

As described above, as the pixel grid A1 or A2 of either display panel overlaps the pixels of the other display panel in the user recognition image S, the user perceives the overlapping pixel grid A1 or A2 and pixel as a synthesized one.

If the pixels of the first and second display panels 32 and 34 emit light when the personal immersive display device is driven, the pixel grid A1 or A2 of either display panel is covered by the light emitted from the pixels of the other display panel, thereby reducing the visibility of the pixel grids A1 and A2. In other words, the sense of grid decreases.

Since the first display panel 32 and the second display panel 34 are offset from each other, a sense of heterogeneity may be felt between the display image of the first display panel 32 and the display image of the second display panel 34.

To reduce or minimize the sense of heterogeneity, the dimension in which the first display panel 32 and the second display panel 34 are offset may be configured to be smaller than the dimension of the pixel. In other words, Hoff may be configured to have a size smaller than the dimension of the pixel in the first direction (horizontal direction; or namely, FPD), and Voff may be configured to have a size smaller than the dimension of the pixel in the second direction (vertical direction; or namely, SPD). In some embodiments, both the horizontal offset distance Hoff and the vertical offset distance Voff are smaller than either the first pixel dimension FPD or the second pixel dimension SPD.

Preferably, to reduce or minimize the area in which the pixel grids A1 and A2 overlap each other in consideration of the width of the pixel grid, the process margin, etc., Hoff may be configured to have a size of ½ of the dimension of the pixel in the first direction (horizontal direction), and Voff may be configured to have a size of ½ of the Dimension of the Pixel in the second direction (vertical direction). In some embodiments, both the horizontal offset distance Hoff and the vertical offset distance Voff is equal to or smaller than half of the first pixel dimension FPD or the second pixel dimension SPD.

In the description with reference to FIGS. 3 and 4, the resolution of the first display panel 32 and the resolution of the second display panel 34 are the same. However, the resolution of the first display panel 32 and the resolution of the second display panel 34 may be different from each other.

Considering that the resolutions of the first display panel 32 and the second display panel 34 are different, Hoff may be configured to have a size smaller than the first-direction (horizontal direction) dimension of the pixel of the display panel having the maximum resolution of the first and second display panels 32 and 34, and Voff may be configured to have a size smaller than the second-direction (vertical direction) dimension of the pixel of the display panel having the maximum resolution of the first and second display panels 32 and 34.

In some embodiments, either the horizontal offset distance Hoff or the vertical offset distance Voff between the first display panel 32 and the second display panel 34 is smaller than the first pixel dimension FPD of a display panel having a greater resolution among the first display panel 32 and the second display panel 34. Similarly, either the horizontal offset distance Hoff or the vertical offset distance Voff between the first display panel 32 and the second display panel 34 is smaller than the second pixel dimension SPD of a display panel having a greater resolution among the first display panel 32 and the second display panel 34.

Preferably, Hoff may be configured as ½ of the first-direction (horizontal direction) dimension of the pixel of the display panel having the maximum resolution of the first and second display panels 32 and 34, and Voff may be configured as ½ of the second-direction (vertical direction) dimension of the pixel of the display panel having the maximum resolution of the first and second display panels 32 and 34.

In some embodiments, either the horizontal offset distance Hoff or the vertical offset Voff distance between the first display panel 32 and the second display panel 34 is half of the first pixel dimension FPD of a display panel having a greater resolution among the first display panel 32 and the second display panel 34. Similarly, either the horizontal offset distance Hoff or the vertical offset Voff distance between the first display panel 32 and the second display panel 34 is half of the second pixel dimension SPD of a display panel having a greater resolution among the first display panel 32 and the second display panel 34.

Although not shown, the first display panel 32 and the second display panel 34 may have the same pixel structure. For example, the pixel structure of the first and second display panels 32 and 34 may be any one selected from among an RGB structure, an RG-BG structure, an RG-BW structure, an M+ structure, or the like.

As another example, the first display panel 32 and the second display panel 34 may have different pixel structures. For example, the pixel structure of the first display panel 32 may be an RGB structure, and the pixel structure of the second display panel 34 may be any one of an RG-BG structure, an RG-BW structure, and an M+ structure. The RGB structure, the RG-BG structure, the RG-BW structure, and the M+ structure are described below with reference to FIGS. 8 to 10.

To reduce the sense of heterogeneity felt by the user because the display panels are offset from each other, the image data to be displayed on each of the first and second display panels 32 and 34 may be created by using source image data having a resolution higher than the resolution of the first and second display panels 32 and 34 and down-sampling the source image data at different positions.

Figure 5:
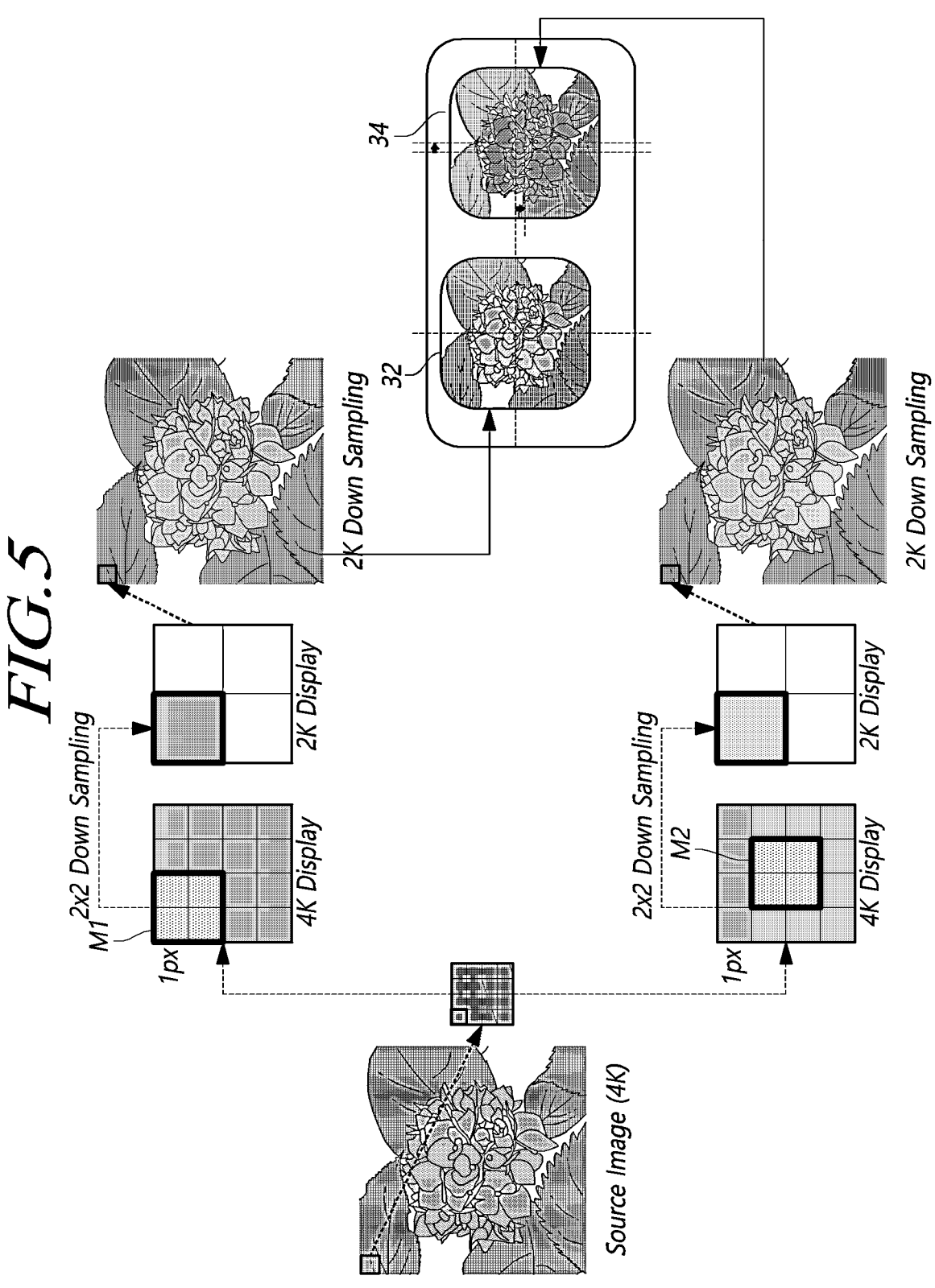
FIGS. 5 and 6 are views illustrating an example downsampling method of a personal immersive display device according to embodiments of the disclosure.
Figure 6:
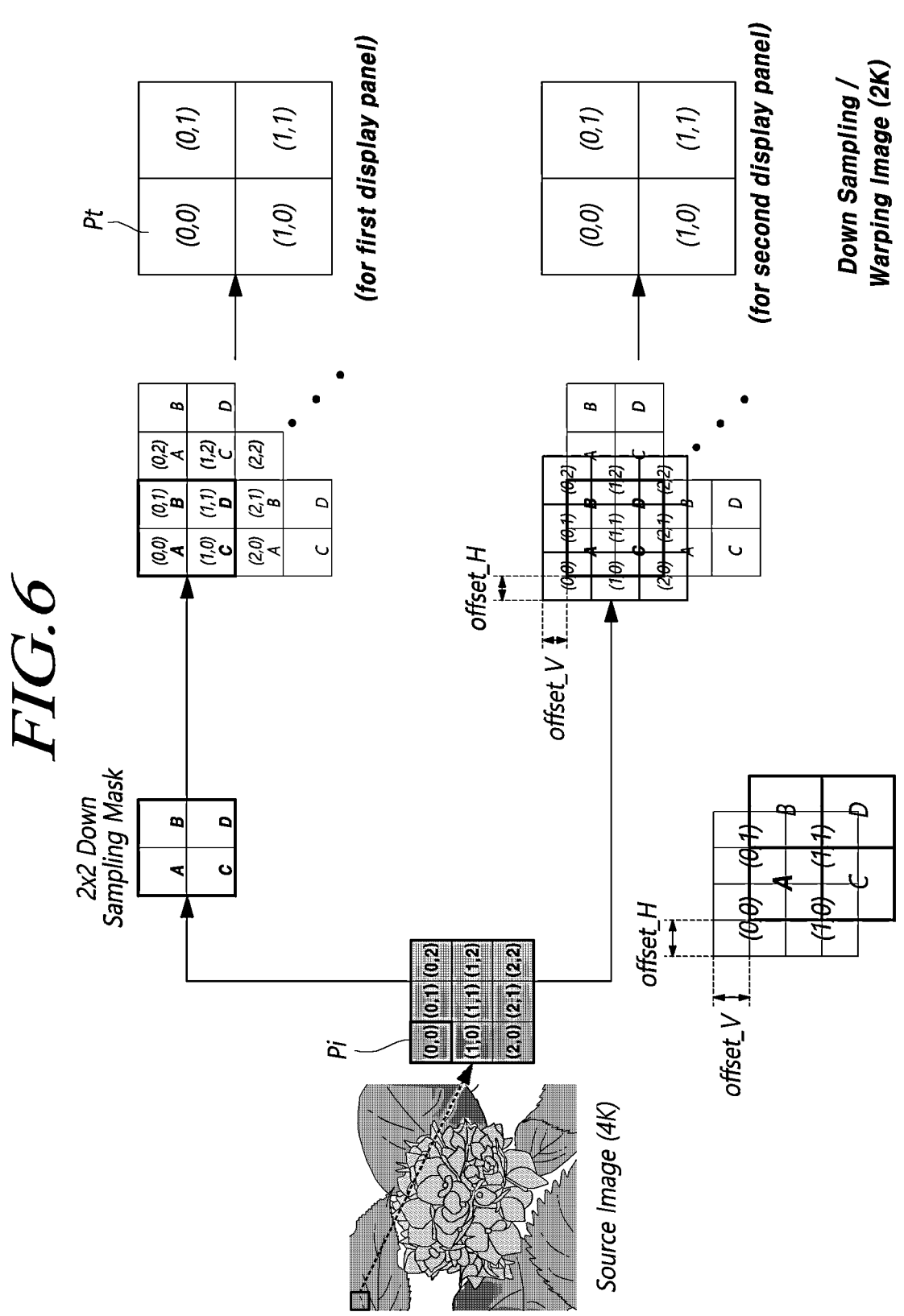

FIGS. 5 and 6 are views illustrating an example down-sampling method of a personal immersive display device according to embodiments of the disclosure.

Referring to FIGS. 5 and 6, the source image data may have a first resolution. The first display panel 32 and the second display panel 34 may have a second resolution lower than the first resolution. FIGS. 5 and 6 illustrate an example in which the resolution of the source image data is 4K and the resolution of the first and second display panels 34 is 2K.

To convert the source image data having the first resolution 4K into the second resolution 2K which is the resolution of the first display panel 32, a 2×2 filter may be used as the first mask M1. To convert the source image data having the first resolution 4K into the second resolution 2K which is the resolution of the second display panel 34, a 2×2 filter may be used as the second mask M2.

FIGS. 5 and 6 illustrate an example in which the resolution of the first display panel 32 and the resolution of the second display panel 34 are the same, and the first mask M1 and the second mask M2 have the same size, but are not limited thereto.

The size of the first mask M1 may be determined according to a difference between the resolution of the source image data and the resolution of the first display panel 32. The size of the second mask M2 may be determined according to a difference between the resolution of the source image data and the resolution of the second display panel 34. When the resolution of the first display panel 32 and the resolution of the second display panel 34 are different from each other, the first mask M1 and the second mask M2 may have different sizes.

To reduce the sense of heterogeneity felt by the user due to offsetting of the display panels 32 and 34, the down-sampling position by the first mask M1 and the down-sampling position by the second mask M2 may be rendered to be different from each other. The difference between the down-sampling position by the first mask M1 and the down-sampling position by the second mask M2 may be defined as a shift offset.

The size and direction of the shift offset may be the same as the size and direction in which the first display panel 32 and the second display panel 34 are offset (shifted) in the user recognition image S.

Since the reference resolution of the shift offset and the reference resolution of the display panel offset (shift) are different from each other, resolution conversion is required.

Since the shift offset indicates a difference in down-sampling position in the source image data, it should be defined based on the resolution of the source image data. Meanwhile, the shift has a size defined based on the resolutions of the first and second display panels 32 and 34.

Since the resolution of the source image data differs from the resolutions of the first and second display panels 32 and 34, the shift offset may be calculated by using Equation 1 below.

$$\text{size of shift offset} = \frac{\text{source image resolution}}{\text{display panel resolution}} \times \text{shift} \qquad \text{Equation 1}$$

For example, when the resolution of the source image data is 3840, the resolutions of the first and second display panels 32 and 34 are 1920, and the shift is ½ pixel, the shift offset is 3840/1920*(½), e.g., 1 pixel.

Here, 1 Pixel means a single pixel with respect to the resolutions of the first and second display panels 32 and 34. 1 pixel refers to a single pixel with respect to the resolution of source image data. Since the resolution of the source image data is high and the resolutions of the first and second display panels 32 and 34 are low, the size of 1 pixel is smaller than the size of 1 Pixel.

The source image data is composed of a plurality of input pixels Pi, and the down-sampling image data is composed of a plurality of target pixels Pt. The size of one target pixel Pt is greater than the size of one input pixel Pi. One target pixel Pt corresponds to a plurality of related input pixels Pi.

The data value (or gradation) of the target pixel Pt may be calculated by calculating the respective area proportions of the plurality of input pixels Pi related to the target pixel Pt, multiplying the area proportions of the related input pixels Pi by corresponding data values, respectively, and dividing the result by the sum of the area proportions.

Specifically, in FIG. 6, the data value of (0,0) among the target pixels Pt for the first display panel may be obtained by multiplying the area proportions 1:1:1:1 of (0,0), (0,1), (1,0), and (1,1), which are the input pixels Pi related to the target pixel, by corresponding data values of the input pixels Pi, respectively, summating them, and dividing the result by 4 which is the sum of the area proportions.

The data value of (0,0) among the target pixels Pt for the second display panel may be obtained by multiplying the area proportions 1:2:1:2:4:2:1:2:1 of (0,0), (0,1), (0,2)(1,0), (1,1), (1,2), (3,0), (3,1), and (3,2), which are the input pixels Pi related to the target pixel, by corresponding data values of the input pixels Pi, respectively, summating them, and dividing the result by 16 which is the sum of the area proportions.

In the above-described embodiments, the first display panel A1 and the second display panel A2 are offset to offset the pixel grid A1 of the first display panel 32 and the pixel grid A2 of the second display panel 34, but the disclosure is not limited thereto.

By configuring the first display panel 32 and the second display panel 34 to have different resolutions, the pixel grid A1 of the first display panel 32 and the pixel grid A2 of the second display panel 34 may be offset from each other.

Figure 7:
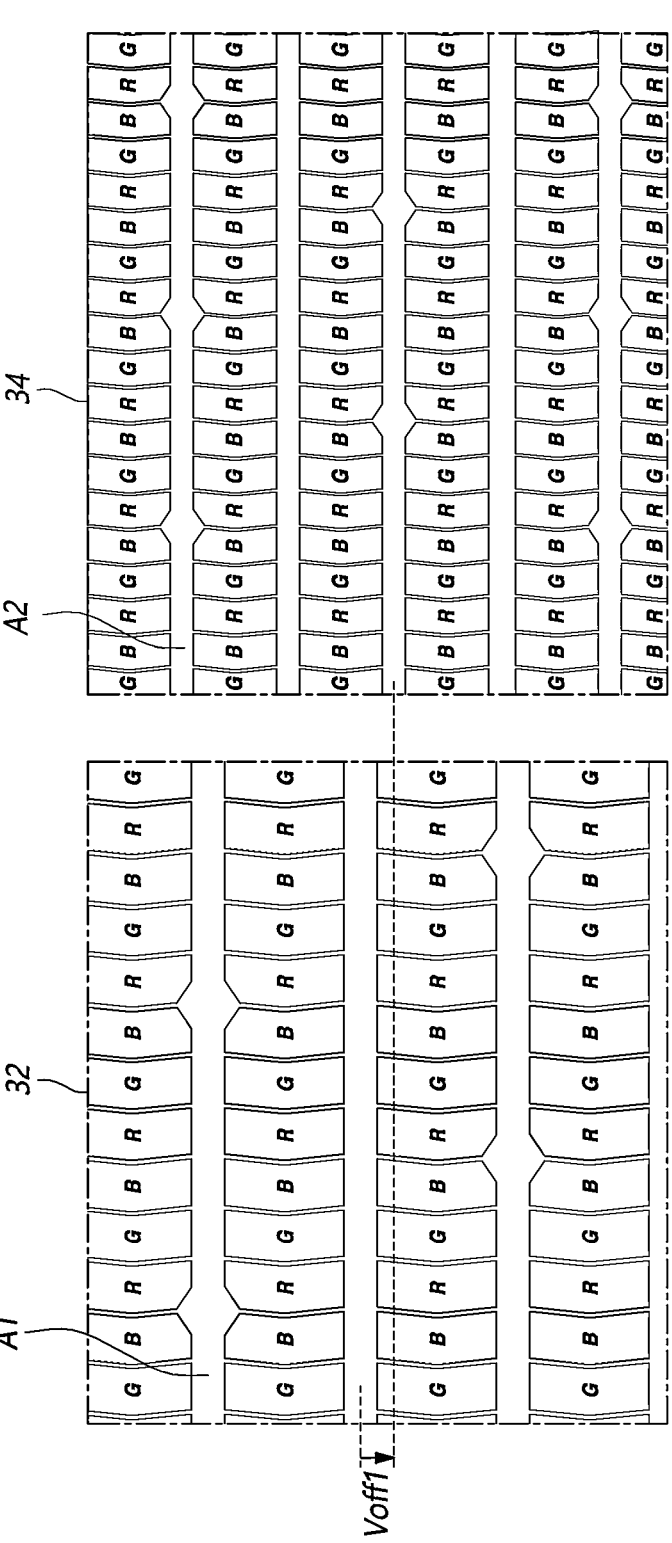
FIG. 7 is a view schematically illustrating a first display panel and a second display panel in a personal immersive display device according to embodiments of the disclosure.

FIG. 7 is a view schematically illustrating a first display panel and a second display panel in a personal immersive display device according to embodiments of the disclosure.

Referring to FIG. 7, the first display panel 32 and the second display panel 34 may have different resolutions.

FIG. 7 illustrates an example in which the resolution of the second display panel 34 is higher than the resolution of the first display panel 32. In this case, the size of the pixel grid A1 of the first display panel 32 is greater than the size of the pixel grid A2 of the second display panel 34.

Voff1 of FIG. 7 indicates the size in which the pixel grid A1 of the first display panel 32 and the pixel grid A2 of the second display panel 34 are offset in the second direction (vertical direction) due to a resolution difference. Although not illustrated, the pixel grid A1 of the first display panel 32 and the pixel grid A2 of the second display panel 34 are offset from each other, and at least part of the pixel grid A1 or A2 of either display panel overlaps pixels of the other display panel.

Accordingly, the user perceives the overlapping pixel grid A1 or A2 and pixels as a synthesized one. If the pixels of the first and second display panels 32 and 34 emit light when the personal immersive display device is driven, the visibility of the pixel grid A1 of A2 of either display panel may be reduced by the light emitted from the pixels of the other display panel, so that the sense of grid may decrease.

The pixel structure of the first display panel 32 and the pixel structure of the second display panel 34 may be the same as each other. For example, the pixel structure of the first and second display panels 32 and 34 may be any one selected from among an RGB structure, an RG-BG structure, an RG-BW structure, an M+ structure, or the like.

As another example, the pixel structure of the first display panel 32 and the pixel structure of the second display panel 34 may be different from each other. For example, the pixel structure of the first display panel 32 may be an RGB structure, and the pixel structure of the second display panel 34 may be any one of an RG-BG structure, an RG-BW structure, and an M+ structure. The RGB structure, the RG-BG structure, the RG-BW structure, and the M+ structure are described below with reference to FIGS. 8 to 10.

Figure 8:
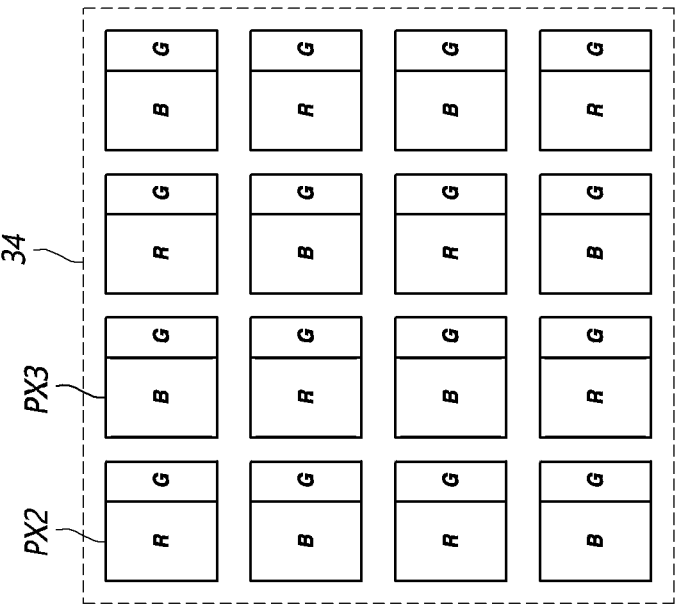
FIGS. 8, 9, and 10 are views illustrating pixel structures of a first display panel and a second display panel in a personal immersive display device according to embodiments of the disclosure.
Figure 8:
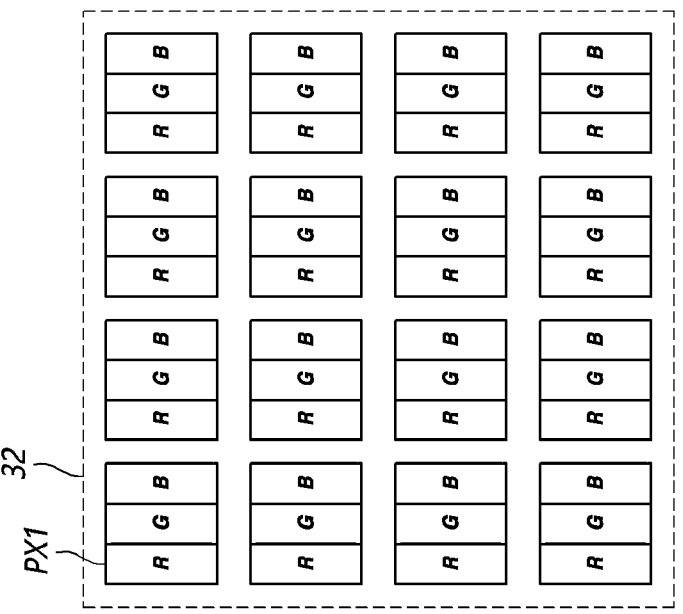
Figure 9:
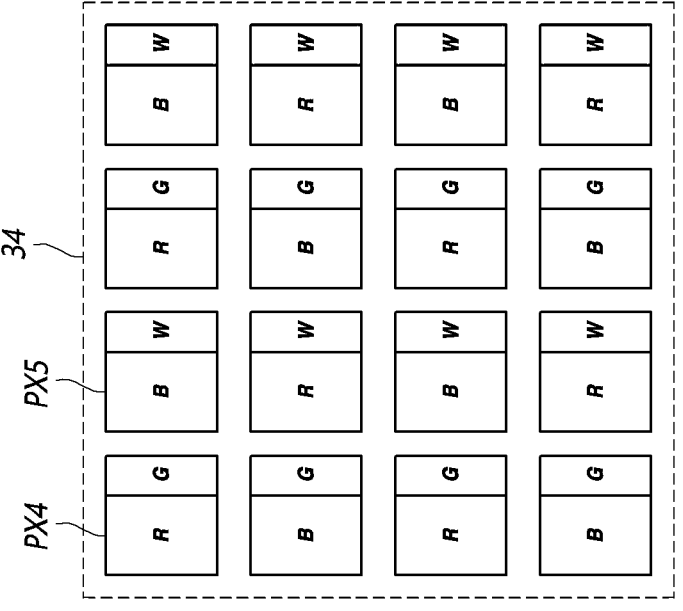
Figure 9:
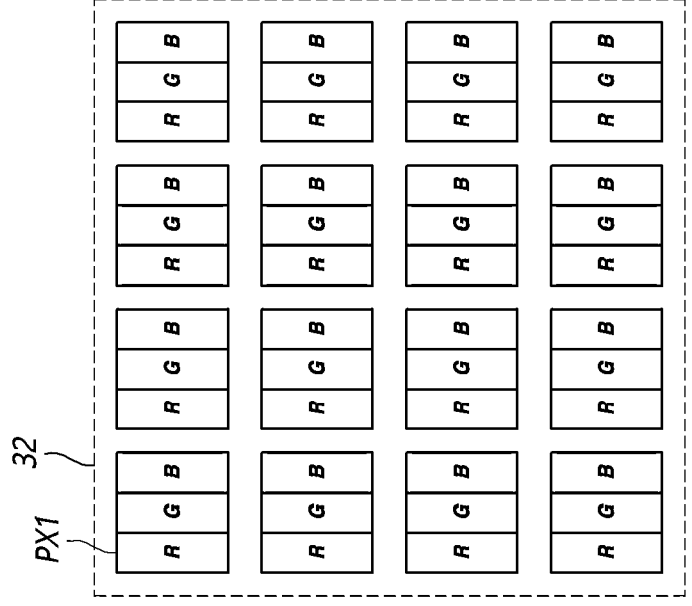
Figure 10:
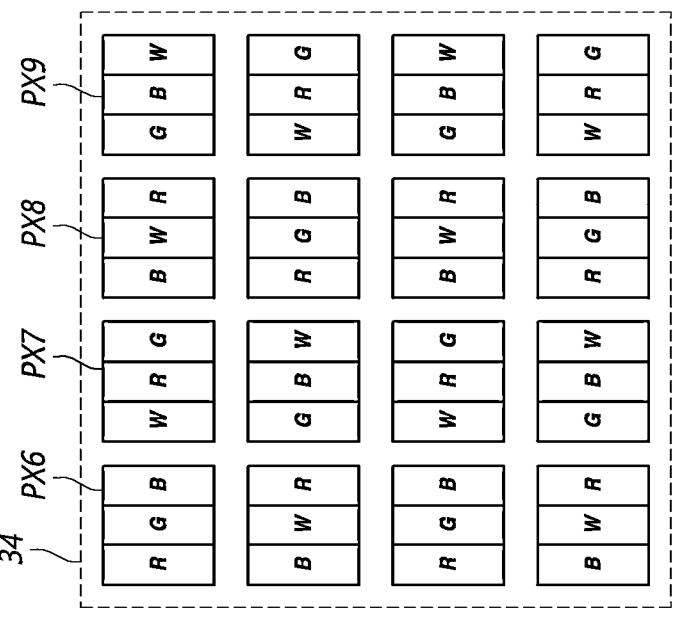
Figure 10:
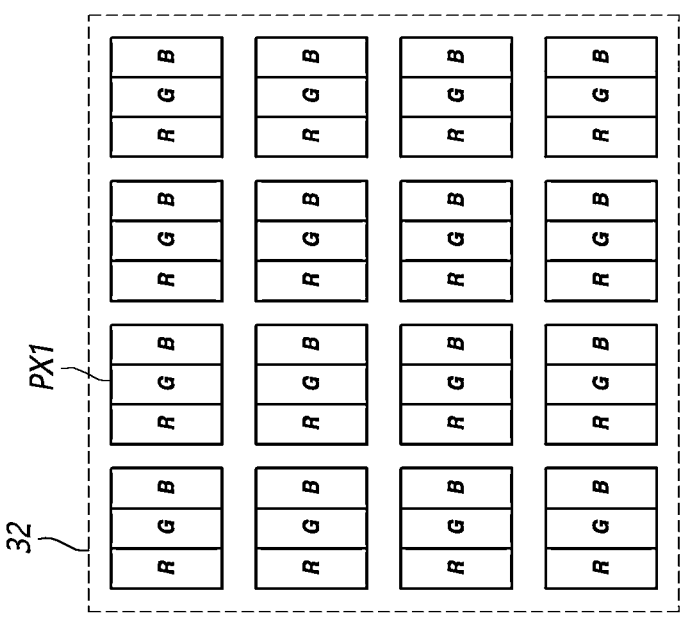

FIGS. 8, 9, and 10 are views illustrating pixel structures of a first display panel and a second display panel in a personal immersive display device according to embodiments of the disclosure.

Referring to FIGS. 8 to 10, the first display panel 32 and the second display panel 34 may have different pixel structures.

Referring to FIG. 8, the pixel structure of the first display panel 32 may be an RGB structure, and the pixel structure of the second display panel 34 may be an RG-BG structure.

Specifically, the first display panel 32 may include a plurality of first pixels PX1 repeatedly disposed in the first direction (horizontal direction) and the second direction (vertical direction). Each first pixel PX1 may include a red subpixel R, a green subpixel G, and a blue subpixel B sequentially disposed along the first direction.

Subpixels of the same color may be arranged in a line along the second direction (vertical direction) in the first display panel 32. For example, the red subpixels R may be disposed in the first column, the green subpixels G may be disposed in the second column, and the blue subpixels B may be disposed in the third column.

The second display panel 32 may include a plurality of second pixels PX2 and a plurality of third pixels PX3 alternately disposed in the first direction (horizontal direction) and the second direction (vertical direction). The second pixel PX2 may include the red subpixel R and the green subpixel G sequentially disposed along the first direction, and the third pixel PX3 may include the blue subpixel B and the green subpixel G sequentially disposed along the first direction.

In the second display panel 34, the red subpixels R and the blue subpixels B may be alternately arranged in odd-numbered columns, and the green subpixels G may be arranged in a line in even-numbered columns. The red subpixel R and the blue subpixel B may have a larger area than the green subpixel G.

Referring to FIG. 9, the pixel structure of the first display panel 32 may be an RGB structure, and the pixel structure of the second display panel 34 may be an RG-BW structure.

Since the RGB structure has been described above with reference to FIG. 8, redundant descriptions will be omitted.

The second display panel 32 may include a plurality of fourth pixels PX4 and a plurality of fifth pixels PX5 alternately disposed along the first direction (horizontal direction) and the second direction (vertical direction). The fourth pixel PX4 may include the red subpixel R and the green subpixel G sequentially disposed along the first direction, and the fifth pixel PX5 may include the blue subpixel B and the white subpixel W sequentially disposed along the first direction.

In the second display panel 34, the red subpixels R and the blue subpixels B may be alternately disposed in odd-numbered columns, and the green subpixels G and the white subpixels W may be alternately disposed in even-numbered columns. The red subpixel R and the blue subpixel B may have larger areas than the green subpixel G and the white subpixel W.

Referring to FIG. 10, the pixel structure of the first display panel 32 may be an RGB structure, and the pixel structure of the second display panel 34 may be an M+ structure.

Since the RGB structure has been described above with reference to FIG. 8, redundant descriptions will be omitted.

The second display panel 34 may include a plurality of sixth pixels PX6, a plurality of seventh pixels PX7, a plurality of eighth pixels PX8, and a plurality of ninth pixels PX9.

The sixth pixel PX6 may include a red subpixel R, a green subpixel G, and a blue subpixel B sequentially disposed along the first direction. The seventh pixel PX7 may include a white subpixel W, a red subpixel R, and a green subpixel G sequentially disposed along the first direction. The eighth pixel PX8 may include a blue subpixel B, a white subpixel W, and a red subpixel R sequentially disposed along the first direction. The ninth pixel PX9 may include a green subpixel G, a blue subpixel B, and a white subpixel W sequentially disposed along the first direction.

The sixth pixel PX6, the seventh pixel PX7, the eighth pixel PX8, and the ninth pixel PX9 are sequentially disposed along the first direction. The sequence of the sixth pixel PX6, the seventh pixel PX7, the eighth pixel PX8, and the ninth pixel PX9 is repeated along the first direction.

The sixth pixel PX6, the seventh pixel PX7, the eighth pixel PX8, and the ninth pixel PX9 are sequentially disposed along the second direction. The sequence of the sixth pixel PX6, the seventh pixel PX7, the eighth pixel PX8, and the ninth pixel PX9 is repeated along the second direction.

Figure 11:
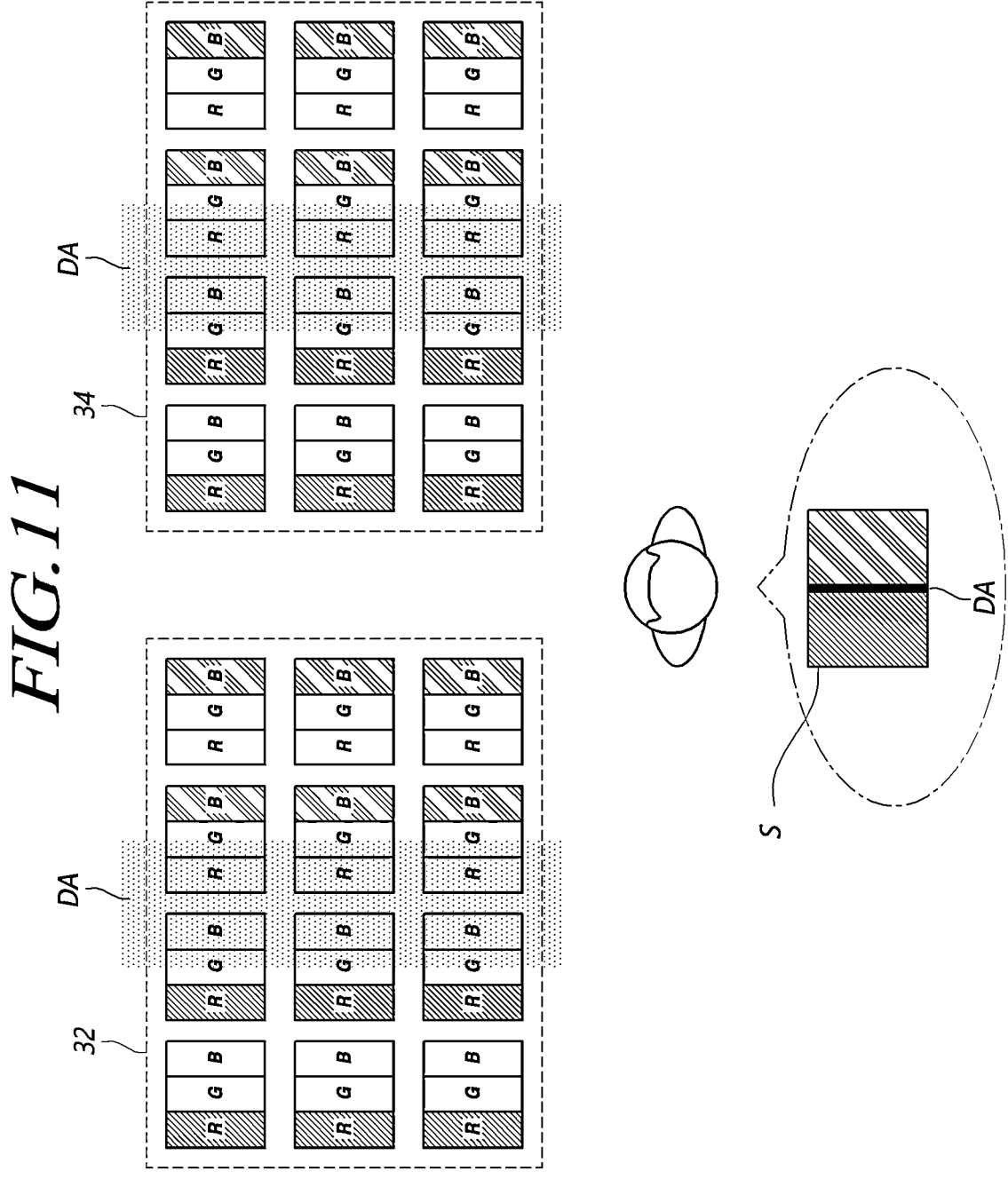
FIG. 11 is a view illustrating a first display panel and a second display panel in a personal immersive display device according to a second comparative example of the disclosure.

FIG. 11 is a view illustrating display panels in a personal immersive display device according to a second comparative example of the disclosure.

Referring to FIG. 11, in the second comparative example, the first display panel 32 and the second display panel 34 have the same pixel structure. For example, the pixel structures of the first display panel 32 and the second display panel 34 may be RGB structures.

In each display panel, when all of the subpixels successively disposed do not emit light, a dark line DA is generated, causing an increase in the sense of grid.

In the second comparative example, since the pixel structure of the first display panel 32 and the pixel structure of the second display panel 34 are the same, the positions of subpixels that do not emit light in the two display panels 32 and 34 may be the same when the device is driven, and the positions where the dark lines DA are generated may be the same. In this case, since the dark line DA of the first display panel 32 and the dark line DA of the second display panel 34 overlap each other in the user recognition image S, there is a high possibility that the user recognizes the dark lines DA, and as the dark line DA is generated along the pixel grid, the user may have the sense of grid.

Figure 12:
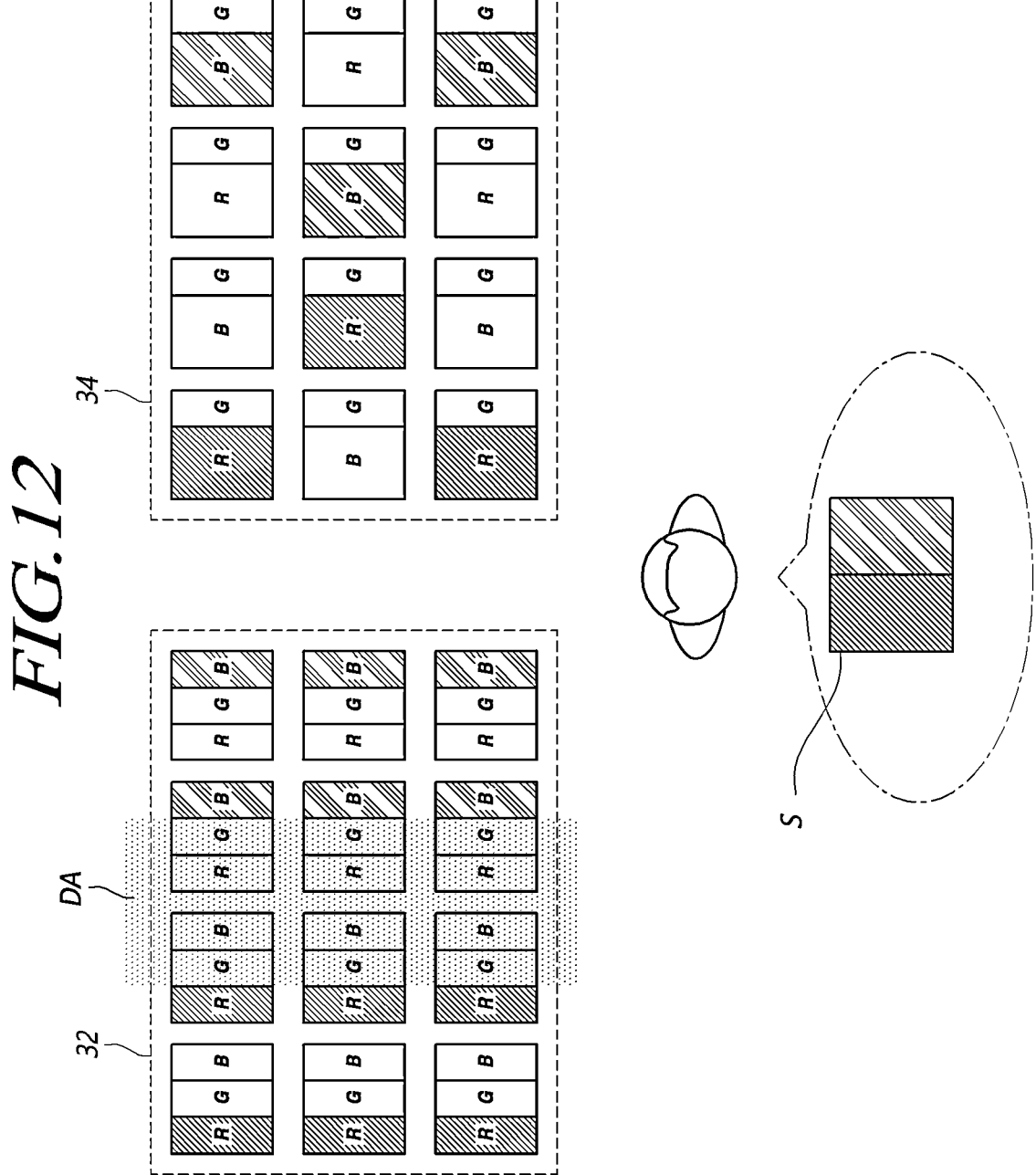
FIGS. 12 and 13 are views illustrating a first display panel and a second display panel in a personal immersive display device according to embodiments of the disclosure as compared with that shown in FIG. 11.
Figure 13:
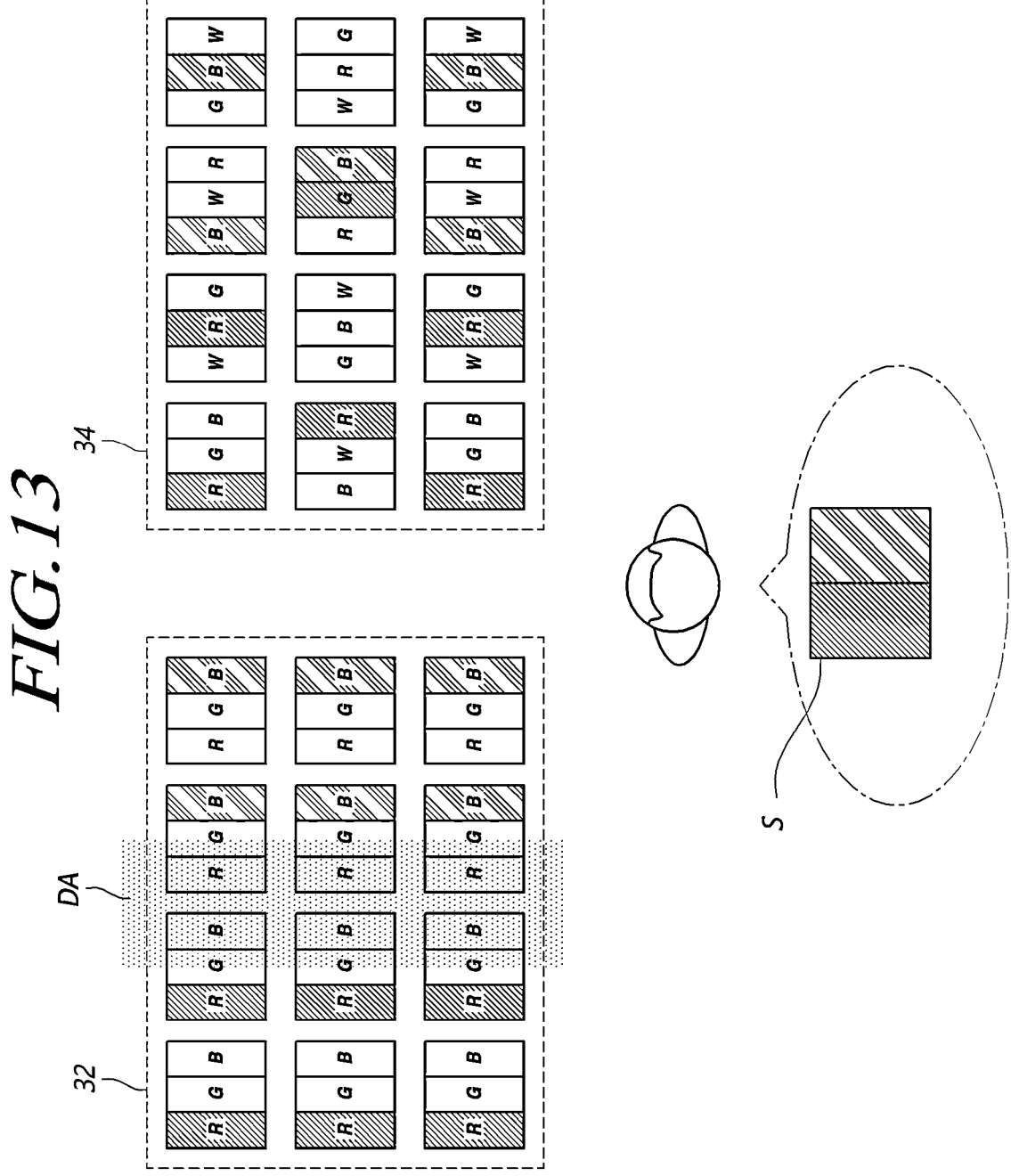

FIGS. 12 and 13 are views illustrating display panels in a personal immersive display device according to embodiments as compared to FIG. 11.

Referring to FIGS. 12 and 13, in the personal immersive display device according to embodiments of the disclosure, the first display panel 32 and the second display panel 34 are configured to have different pixel structures. For example, as illustrated in FIG. 12, the pixel structure of the first display panel 32 may be an RGB structure, and the pixel structure of the second display panel 34 may be an RG-BG structure. As another example, as shown in FIG. 13, the pixel structure of the first display panel 32 may be an RGB structure, and the pixel structure of the second display panel 34 may be an M+ structure.

As the pixel structure of the first display panel 32 and the pixel structure of the second display panel 34 are different from each other, positions where the dark lines DA are generated in the two display panels 32 and 34 may be different from each other.

As illustrated in FIGS. 12 and 13, even if a dark line DA is generated due to non-emission pixels on one display panel, the subpixels at the position corresponding to the dark line DA may emit light on the other display panel so that dark line may not be generated.

Since the user recognizes the dark line DA and the light generated from the pixel of the other display panel as a synthesized one, the visibility of the dark line DA is reduced by the light generated from the pixel of the other display panel, and the sense of grid due to the dark line DA is reduced.

Figure 14:
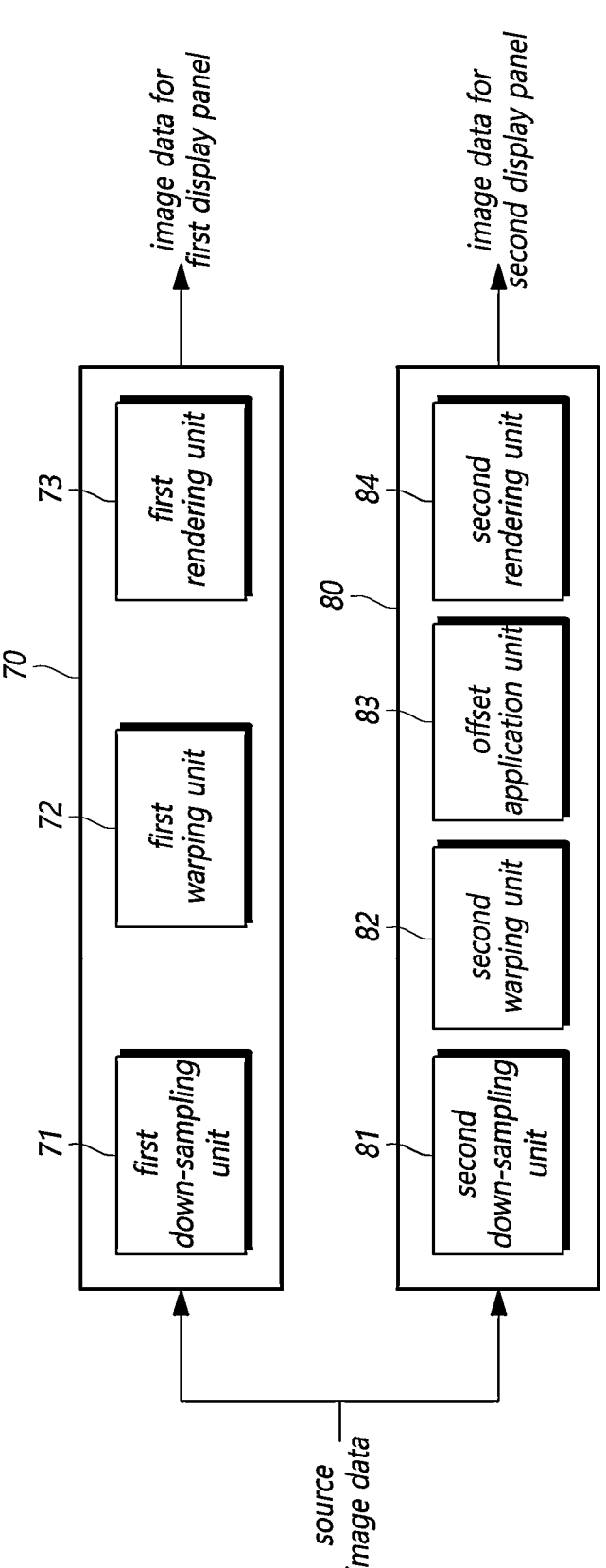
FIG. 14 is a block diagram illustrating a configuration of an image processing unit of a personal immersive display device according to embodiments of the disclosure.

FIG. 14 is a block diagram illustrating a configuration of an image processing unit of a personal immersive display device according to embodiments of the disclosure.

Referring to FIG. 14, an image processing unit of a personal immersive display device according to embodiments of the disclosure may include a first image processing unit 70 generating image data for a first display panel from source image data and a second image processing unit 80 generating image data for a second display panel from the source image data.

The first image processing unit 70 may include a first down-sampling unit 71. The first down-sampling unit 71 may convert source image data (input image) having a first resolution into image data having a second resolution lower than the first resolution using a first mask.

The first image processing unit 70 may include a first warping unit 72. The first warping unit 72 may perform geometric processing on the image by shifting the position of the pixel using the first mask.

The first image processing unit 70 may include a first rendering unit 73. The first rendering unit 72 may render the image data down-sampled or/and warped through the first down-sampling unit 71 or/and the first warping unit 72 to fit the pixel structure of the first display panel 32.

The second image processing unit 80 may include a second down-sampling unit 81. The second down-sampling unit 81 may convert the source image (input image) having the first resolution into an image having a third resolution lower than the first resolution using a second mask.

The second image processing unit 80 may include a second warping unit 82. The second warping unit 82 may perform geometric processing on the image by shifting the position of the pixel using the second mask.

To provide an image without a sense of heterogeneity using the first display panel 32 and the second display panel 34 offset from each other, when warping or/and down-sampling using the second mask, the position of warping or/and down-sampling using the second mask may be offset with respect to the position of warping or/and down-sampling using the first mask. To that end, the second image processing unit 80 may further include an offset application unit 83.

The offset application unit 83 may calculate a difference in position between the source image data warped or/and down-sampled by the first mask and the source image data warped or/and down-sampled by the second mask, e.g., a shift offset.

The offset application unit 83 may calculate a shift offset value by converting an offset size between the first display panel 32 and the second display panel 34 into the first resolution.

The second down-sampling unit 81 and the second warping unit 82 may change the mask application method based on the shift offset set by the offset application unit 83. For example, when the shift offset is 1 pixel, the second down-sampling unit 81 and the second warping unit 82 may sample the source image data at a position, 1 pixel different from the position sampled by the first down-sampling unit 71 and the first warping unit 72.

The second image processing unit 80 may include a second rendering unit 84. The second rendering unit 84 may render the image data down-sampled and/or warped through the second down-sampling unit 81 and/or the second warping unit 82 to fit the pixel structure of the second display panel 34.

For example, when the source image data is RGB image data and the pixel structure of the second display panel 34 is an RG-BW structure, the second rendering unit 84 may render the RGB image data into RG-BW image data to fit the RG-BW pixel structure of the second display panel 34.

Embodiments of the disclosure described above are briefly described below.

According to embodiments of the disclosure, there may be provided a personal immersive display device, comprising a first display panel and a second display panel each including a plurality of pixels, wherein the first display panel and the second display panel are offset from each other in a user's field of view.

According to embodiments of the disclosure, there may be provided the personal immersive display device, wherein a pixel grid of the first display panel and a pixel grid of the second display panel are offset from each other in the user field of view.

According to embodiments of the disclosure, there may be provided the personal immersive display device, wherein a dimension of the offset between the first display panel and the second display panel is smaller than a pixel dimension of a display panel having a maximum resolution of the first display panel and the second display panel.

According to embodiments of the disclosure, there may be provided the personal immersive display device, wherein a dimension of the offset between the first display panel and the second display panel is half a pixel dimension of a display panel having a maximum resolution of the first display panel and the second display panel.

According to embodiments of the disclosure, there may be provided the personal immersive display device, wherein the plurality of pixels are arranged in a first direction and a second direction, and wherein the first display panel and the second display panel are offset in a third direction crossing the first direction and the second direction.

According to embodiments of the disclosure, there may be provided the personal immersive display device further comprising a first down-sampling unit generating image data for the first display panel by down-sampling source image data and a second down-sampling unit generating image data for the second display panel by down-sampling the source image data, wherein a position of the source image data down-sampled by the first down-sampling unit and a position of the source image data down-sampled by the second down-sampling unit are offset by a position at which the first display panel and the second display panel are offset.

According to embodiments of the disclosure, there may be provided the personal immersive display device further comprising a first warping unit generating image data for the first display panel by warping source image data and a second warping unit generating image data for the second display panel by warping the source image data, wherein a position of the source image data warped by the first warping unit and a position of the source image data warped by the second warping unit are offset by a position at which the first display panel and the second display panel are offset.

According to embodiments of the disclosure, there may be provided the personal immersive display device, wherein the first display panel and the second display panel are different from each other in at least one of resolution and pixel structure.

According to embodiments of the disclosure, there may be provided the personal immersive display device, wherein each of a plurality of pixels of the first display panel includes a red subpixel, a green subpixel, and a blue subpixel sequentially disposed along a first direction, wherein a plurality of pixels of the second display panel include a plurality of first pixels and a plurality of second pixels alternately disposed along the first direction and a second direction, wherein each of the plurality of first pixels includes a red subpixel and a green subpixel sequentially disposed along the first direction, and wherein each of the plurality of second pixels includes a blue subpixel and a green subpixel sequentially disposed along the first direction.

According to embodiments of the disclosure, there may be provided the personal immersive display device, wherein each of a plurality of pixels of the first display panel includes a red subpixel, a green subpixel, and a blue subpixel sequentially disposed along a first direction, wherein a plurality of pixels of the second display panel include a plurality of first pixels and a plurality of second pixels alternately disposed along the first direction and a second direction, wherein each of the plurality of first pixels includes a red subpixel and a green subpixel sequentially disposed along the first direction, and wherein each of the plurality of second pixels includes a blue subpixel and a white subpixel sequentially disposed along the first direction.

According to embodiments of the disclosure, there may be provided the personal immersive display device, wherein each of a plurality of pixels of the first display panel includes a red subpixel, a green subpixel, and a blue subpixel sequentially disposed along a first direction, wherein the plurality of pixels of the display panel include a plurality of first pixels, a plurality of second pixels, a plurality of third pixels, and a plurality of fourth pixels, wherein each of the plurality of first pixels includes a red subpixel, a green subpixel, and a blue subpixel sequentially disposed along the first direction, wherein each of the plurality of second pixels includes a white subpixel, a red subpixel, and a green subpixel sequentially disposed along the first direction, wherein each of the plurality of third pixels includes a blue subpixel, a white subpixel, and a red subpixel sequentially disposed along the first direction, wherein each of the plurality of fourth pixels includes a green subpixel, a blue subpixel, and a white subpixel sequentially disposed along the first direction, and wherein a sequence of the first pixel, the second pixel, the third pixel, and the fourth pixel is repeated along the first direction, and a sequence of the first pixel, the second pixel, the third pixel, and the fourth pixel is repeated along the second direction.

According to embodiments of the disclosure, there may be provided a personal immersive display device, comprising a first display panel and a second display panel each including a plurality of pixels, wherein the first display panel and the second display panel are different from each other in at least one of resolution and pixel structure.

According to embodiments of the disclosure, there may be provided the personal immersive display device, wherein each of a plurality of pixels of the first display panel includes a red subpixel, a green subpixel, and a blue subpixel sequentially disposed along a first direction, wherein a plurality of pixels of the second display panel include a plurality of first pixels and a plurality of second pixels alternately disposed along the first direction and a second direction, wherein each of the plurality of first pixels includes a red subpixel and a green subpixel sequentially disposed along the first direction, and wherein each of the plurality of second pixels includes a blue subpixel and a green subpixel sequentially disposed along the first direction.

According to embodiments of the disclosure, there may be provided the personal immersive display device, wherein each of a plurality of pixels of the first display panel includes a red subpixel, a green subpixel, and a blue subpixel sequentially disposed along a first direction, wherein a plurality of pixels of the second display panel include a plurality of first pixels and a plurality of second pixels alternately disposed along the first direction and a second direction, wherein each of the plurality of first pixels includes a red subpixel and a green subpixel sequentially disposed along the first direction, and wherein each of the plurality of second pixels includes a blue subpixel and a white subpixel sequentially disposed along the first direction.

According to embodiments of the disclosure, there may be provided the personal immersive display device, wherein each of a plurality of pixels of the first display panel includes a red subpixel, a green subpixel, and a blue subpixel sequentially disposed along a first direction, wherein the plurality of pixels of the display panel include a plurality of first pixels, a plurality of second pixels, a plurality of third pixels, and a plurality of fourth pixels, wherein each of the plurality of first pixels includes a red subpixel, a green subpixel, and a blue subpixel sequentially disposed along the first direction, wherein each of the plurality of second pixels includes a white subpixel, a red subpixel, and a green subpixel sequentially disposed along the first direction, wherein each of the plurality of third pixels includes a blue subpixel, a white subpixel, and a red subpixel sequentially disposed along the first direction, wherein each of the plurality of fourth pixels includes a green subpixel, a blue subpixel, and a white subpixel sequentially disposed along the first direction, and wherein a sequence of the first pixel, the second pixel, the third pixel, and the fourth pixel is repeated along the first direction, and a sequence of the first pixel, the second pixel, the third pixel, and the fourth pixel is repeated along the second direction.

According to embodiments of the disclosure, there may be provided a personal immersive display device capable of reducing the sense of grid by disposing a first display panel and a second display panel to be offset from each other to allow the pixel grid of the first display panel and the pixel grid of the second display panel to be offset from each other so that the pixel grid to overlap the pixel grid of either display panel overlaps the pixel of the other display panel and is faded by the light emitted from the overlapped pixel.

According to embodiments of the disclosure, there may be provided a personal immersive display device capable of reducing a sense of heterogeneity between the left eye image and right eye image due to an offset between display panels by offsetting the sampling position of the left eye image and the sampling position of the right eye image by the offset between the first display panel and the second display panel when sampling the left eye image and the right eye image in the source image.

According to embodiments of the disclosure, there may be provided a personal immersive display device capable of reducing the sense of grid by configuring the first display panel and the second display panel to have different resolutions so that the pixel grid of either display panel overlaps the pixel of the other display panel in the user's field of view and is faded by the light emitted from the overlapped pixel.

According to embodiments of the disclosure, there may be provided a personal immersive display device capable of reducing generation of a dark line at corresponding positions of the first display panel and the second display panel and perception of a dark line by configuring the first display panel and the second display panel to have different pixel structures.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A personal immersive display device, comprising:
a first display panel having a first plurality of pixels thereon; and
a second display panel having a second plurality of pixels thereon,
wherein the first display panel and the second display panel are offset from each other in a user's field of view, and
wherein a dimension of the offset between the first display panel and the second display panel is half a pixel dimension of a display panel having a maximum resolution of the first display panel and the second display panel.

2. The personal immersive display device of claim 1, wherein a pixel grid of the first display panel and a pixel grid of the second display panel are offset from each other in the user's field of view.

3. The personal immersive display device of claim 1, wherein the first display panel and the second display panel have different resolutions from each other.

4. The personal immersive display device of claim 1, wherein the first and second plurality of pixels is arranged in a first direction and a second direction, and
wherein the first display panel and the second display panel are offset in a third direction transverse to the first direction and the second direction.

5. The personal immersive display device of claim 1, further comprising:
a first down-sampling circuit generating image data for the first display panel by down-sampling source image data; and
a second down-sampling circuit generating image data for the second display panel by down-sampling the source image data, wherein a position of the source image data down-sampled by the first down-sampling circuit and a position of the source image data down-sampled by the second down-sampling circuit are offset by a position at which the first display panel and the second display panel are offset.

6. The personal immersive display device of claim 1, further comprising:
   a first warping circuit generating image data for the first display panel by warping source image data, and
   a second warping circuit generating image data for the second display panel by warping the source image data,
   wherein a position of the source image data warped by the first warping circuit and a position of the source image data warped by the second warping circuit are offset by a position at which the first display panel and the second display panel are offset.

7. The personal immersive display device of claim 1, wherein the first display panel and the second display panel are different from each other in at least one of resolution and pixel structure.

8. An immersive wearable device, comprising:
   a wearable gear configured to be worn by a user;
   a display module coupled to the wearable gear, the display module including a first display panel configured to display image data for a first eye of the user and a second display panel configured to display image data for a second eye of the user, the first and second display panels each including a plurality of pixels,
   wherein each pixel of the plurality of pixels in the first and second display panels have a first pixel dimension in a first direction and a second pixel dimension in a second direction transverse to the first direction,
   wherein the first pixel dimension and the second pixel dimension define a size of a single pixel,
   wherein, in operation, the second display panel is shifted by a horizontal offset distance and a vertical offset distance with respect to the first display panel, and
   wherein the first display panel and the second display panel are offset from each other in a user's field of view, and wherein a dimension of the offset between the first display panel and the second display panel is half a pixel dimension of a display panel having a maximum resolution of the first display panel and the second display panel.

9. The immersive wearable device of claim 8, comprising:
   a lens module coupled to the display module, the lens module including a pair of wide-angle lens configured to widen a viewing angle of the first eye and the second eye of the user,
   wherein a first wide-angle lens of the pair of wide-angel lens is disposed between the first eye of the user and the display module, and
   wherein a second wide-angle lens of the pair of wide-angel lens is disposed between the second eye of the user and the display module.

10. The immersive wearable device of claim 8, wherein both the horizontal offset distance and the vertical offset distance are smaller than the second pixel dimension.

11. The immersive wearable device of claim 8, wherein the first display panel and the second display panel have different resolutions from each other.

12. The immersive wearable device of claim 11, wherein either the horizontal offset distance or the vertical offset distance between the first display panel and the second display panel is half of the first pixel dimension of a display panel having a greater resolution among the first display panel and the second display panel.

13. The immersive wearable device of claim 8,
   wherein either the horizontal offset distance or the vertical offset distance between the first display panel and the second display panel is half of the first pixel dimension of a display panel having a greater resolution among the first display panel and the second display panel.

14. The immersive wearable device of claim 8, wherein both the horizontal offset distance and the vertical offset distance is equal to or smaller than half of the first pixel dimension.

* * * * *